United States Patent
Nathan et al.

(10) Patent No.: US 7,730,700 B2
(45) Date of Patent: Jun. 8, 2010

(54) HEADER GROUND SENSOR

(75) Inventors: Cristoph Nathan, Missouri Valley, IA (US); Jens Petersen, Omaha, NE (US); Steve Tippery, Gretna, NE (US)

(73) Assignee: Claas Selbstefahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/241,841

(22) Filed: Sep. 30, 2008

(65) Prior Publication Data

US 2010/0077712 A1    Apr. 1, 2010

(51) Int. Cl.
*A01D 41/14* (2006.01)
*A01D 46/08* (2006.01)
*A01D 75/28* (2006.01)

(52) U.S. Cl. .................................................. 56/10.2 E
(58) Field of Classification Search ............... 56/10.2 E, 56/208, 214, DIG. 10; 172/4
See application file for complete search history.

(56) References Cited

U.S. PATENT DOCUMENTS

| | | | | |
|---|---|---|---|---|
| 2,750,727 | A * | 6/1956 | Wright | 56/208 |
| 3,163,974 | A * | 1/1965 | Mack | 56/10.2 E |
| 3,196,599 | A * | 7/1965 | Meiners et al. | 56/10.2 E |
| 3,611,681 | A * | 10/1971 | Blanton et al. | 56/10.4 |
| 3,643,407 | A * | 2/1972 | Hubbard et al. | 56/10.2 E |
| 3,698,164 | A * | 10/1972 | Boone et al. | 56/10.4 |
| 3,716,976 | A * | 2/1973 | Copley et al. | 56/106 |
| 3,728,851 | A * | 4/1973 | Van Antwerp | 56/208 |
| 3,747,311 | A * | 7/1973 | DeCoene et al. | 56/208 |
| 3,851,451 | A * | 12/1974 | Agness et al. | 56/10.2 E |
| 3,886,718 | A * | 6/1975 | Talbot | 56/208 |
| 4,124,970 | A * | 11/1978 | Bernhardt | 56/10.2 E |
| 4,136,508 | A * | 1/1979 | Coleman et al. | 56/208 |
| 4,147,016 | A * | 4/1979 | Jensen et al. | 56/15.8 |
| 4,199,925 | A * | 4/1980 | Quick et al. | 56/208 |
| 4,211,057 | A * | 7/1980 | Dougherty et al. | 56/10.2 E |
| 4,409,778 | A * | 10/1983 | McNaught | 56/10.2 A |
| 4,594,840 | A * | 6/1986 | D'Almeida et al. | 56/11.2 |
| 4,747,260 | A * | 5/1988 | Petrasch et al. | 56/505 |
| 4,809,487 | A * | 3/1989 | Junge et al. | 56/10.2 E |
| 4,942,724 | A * | 7/1990 | Diekhans et al. | 56/10.4 |
| 5,090,184 | A * | 2/1992 | Garter et al. | 56/10.2 E |

(Continued)

FOREIGN PATENT DOCUMENTS

DE      10227484 A1    2/2004

(Continued)

*Primary Examiner*—Árpáp Fábián-Kovács
(74) *Attorney, Agent, or Firm*—Robert C. Haldiman; Husch Blackwell Sanders LLP (57) ABSTRACT

The invention is a combination of a short ground sensor arm mounted close to the cutter bar and a longer rod mounted towards the rear of the header. The short front sensor and long rear sensor are connected by a linkage which translates motions from either sensor to the other sensor. A second linkage translates the motions of both sensors rearward to a protected area under the header which contains the potentiometer. This configuration transmits useful ground position signals to the header height controller in both low and high cutting heights. The invention advantageously reduces the likelihood of damage to the short front sensor when the machine is reversed since the longer rear sensor arm pulls the shorter forward sensor arm up by means of the linkage to a position where damage is unlikely.

8 Claims, 7 Drawing Sheets

U.S. PATENT DOCUMENTS

| | | | | |
|---|---|---|---|---|
| 5,115,628 | A * | 5/1992 | Garter et al. | 56/10.2 E |
| 5,299,413 | A * | 4/1994 | Gale | 56/10.2 E |
| 5,359,836 | A * | 11/1994 | Zeuner et al. | 56/10.2 E |
| 5,463,854 | A * | 11/1995 | Chmielewski et al. | 56/10.2 E |
| 5,469,694 | A * | 11/1995 | Panousheck et al. | 56/10.2 E |
| 5,471,823 | A * | 12/1995 | Panoushek et al. | 56/10.2 E |
| 5,471,825 | A * | 12/1995 | Panoushek et al. | 56/10.2 E |
| 5,473,870 | A * | 12/1995 | Panoushek et al. | 56/10.2 E |
| 5,535,577 | A * | 7/1996 | Chmielewski et al. | 56/10.2 E |
| 5,577,373 | A * | 11/1996 | Panoushek et al. | 56/10.2 E |
| 5,704,200 | A * | 1/1998 | Chmielewski et al. | 56/10.2 E |
| 5,713,190 | A * | 2/1998 | Vermeulen et al. | 56/10.2 E |
| 5,937,621 | A * | 8/1999 | Eggenhaus | 56/10.2 E |
| 6,041,583 | A * | 3/2000 | Goering et al. | 56/10.2 E |
| 6,202,395 | B1 * | 3/2001 | Gramm | 56/10.2 E |
| 6,289,659 | B1 * | 9/2001 | Fox | 56/10.2 E |
| 6,510,680 | B2 * | 1/2003 | Uhlending et al. | 56/208 |
| 6,516,595 | B2 * | 2/2003 | Rhody et al. | 56/10.2 E |
| 6,523,333 | B2 * | 2/2003 | Metzger | 56/10.2 E |
| 6,530,197 | B1 * | 3/2003 | Christensen et al. | 56/10.2 E |
| 6,588,187 | B2 * | 7/2003 | Engelstad et al. | 56/10.2 E |
| 6,758,029 | B2 * | 7/2004 | Beaujot | 56/10.2 E |
| 6,826,894 | B2 * | 12/2004 | Thiemann et al. | 56/10.2 E |
| 6,883,299 | B1 * | 4/2005 | Gramm | 56/10.2 E |
| 7,222,474 | B2 * | 5/2007 | Rayfield et al. | 56/10.2 E |
| 7,310,931 | B2 * | 12/2007 | Gramm | 56/208 |

FOREIGN PATENT DOCUMENTS

| | | | |
|---|---|---|---|
| EP | 1374661 | B1 | 1/2008 |

* cited by examiner

HEADER GROUND SENSOR

CROSS-REFERENCE TO RELATED APPLICATIONS

None

STATEMENT REGARDING FEDERALLY SPONSORED RESEARCH

Not Applicable.

APPENDIX

Not Applicable.

BACKGROUND OF THE INVENTION

1. Field of the Invention

The present invention is in the field of crop harvesting equipment such as combines and harvesters.

2. Related Art

Agricultural machines such as combines and harvesters use headers to cut crop and move it into the machine for processing. The headers can be raised and lowered to cut the crop at various heights. Many headers are equipped with ground sensors that contact the ground as the header moves through a field during harvest. As the ground terrain changes the sensors move up and down in response. A potentiometer measures the angle of change of the ground sensors and continually sends an electric voltage to a computer controller which moves the header according to the signals from the ground sensors' constant contact with the ground contour. This keeps the header at a user selected height automatically.

There is a wide range of cutting heights that are desirable. Mechanical configurations for ground sensors that work well for higher heights, for example 400 millimeters, do not work well at lower heights in common usage, for example 25 millimeters, and vice versa.

Separately, it is advantageous for the sensor ground contact position to be very close to the cutter bar, at the leading edge of the header. This position close to the cutter bar allows the header to react quickly to changing ground contours. In the prior art long sensors mounted near the front of the header and near the cutter bar worked well for high cutting heights but, when the cutting height was lower, the long sensor arms, which move around a pivot mount, would contact the ground at a position too far to the rear of the cutter bar to respond quickly to changes in ground contour. Thus, long ground sensor arms did not work well for short cutting heights. Short ground sensor arms were advantageously responsive at short cutting heights, but would not reach the ground at all at high cutter heights.

Moreover, a short straight ground sensor mounted close to the cutter bar risked breakage when the operator backed the machine up with the sensor in its down position. The short sensor could also be broken if the operator lowered the header without simultaneously moving the machine forward. This double motion was not guaranteed.

SUMMARY OF THE INVENTION

One aspect of the invention combines a short ground sensor arm mounted close to the cutter bar and a longer rod mounted towards the rear of the header in a direction of travel. The short front sensor and long rear sensor are connected by a linkage which translates motions from either sensor to the other sensor. A second linkage translates the motions of either sensor rearward to a protected area under the header which contains a potentiometer. This configuration transmits useful ground position signals to the header height controller at both low and high cutting heights. The invention advantageously reduces the likelihood of damage to the short front cutter bar when the machine is reversed since the longer rear sensor arm pulls the shorter forward sensor arm up by means of the linkage to a position where damage is unlikely.

In another aspect of the invention the rear sensor arm is dimensioned to be substantially coterminous with the rear side of the header. In yet another aspect of the invention, the sensor arms are mounted in a central portion of the header in the transverse direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring now to the drawings wherein like reference numbers indicated like elements, crop header 10 includes a bottom element 12 and, located foremost in the direction of travel, a cutter bar 14.

Pivotally mounted on or adjacent to said cutter bar 14 is a forward height sensor arm 16. In the depicted embodiment, forward height sensor arm 16 is relatively short and straight. Thus positioned, the forward ground sensor arm responds quickly to ground contour changes when the header is at a low cutting height.

Figure 3:
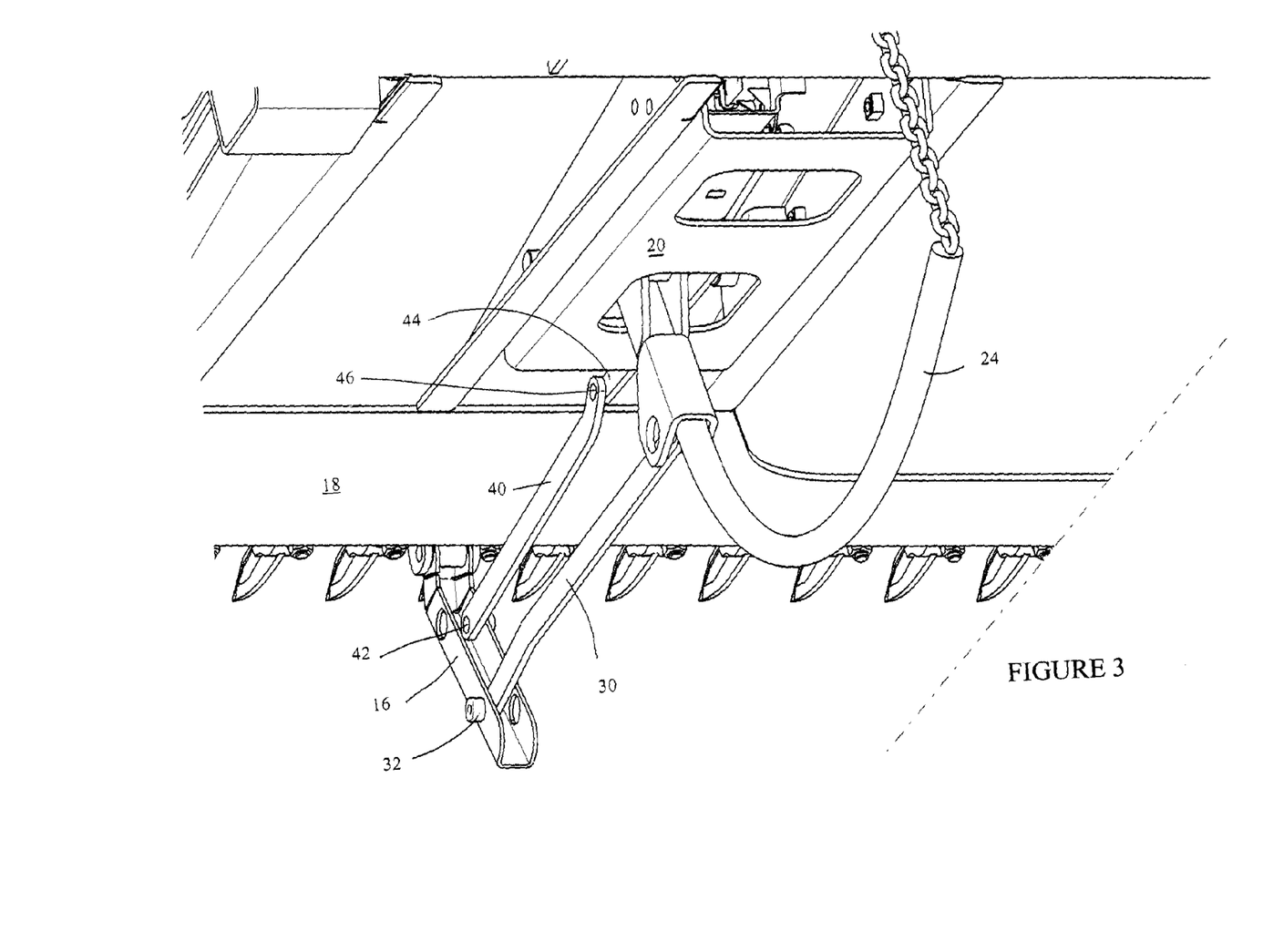
FIG. 3 is a lower perspective view of the ground sensor system in a generally lowered position.
Figure 4:
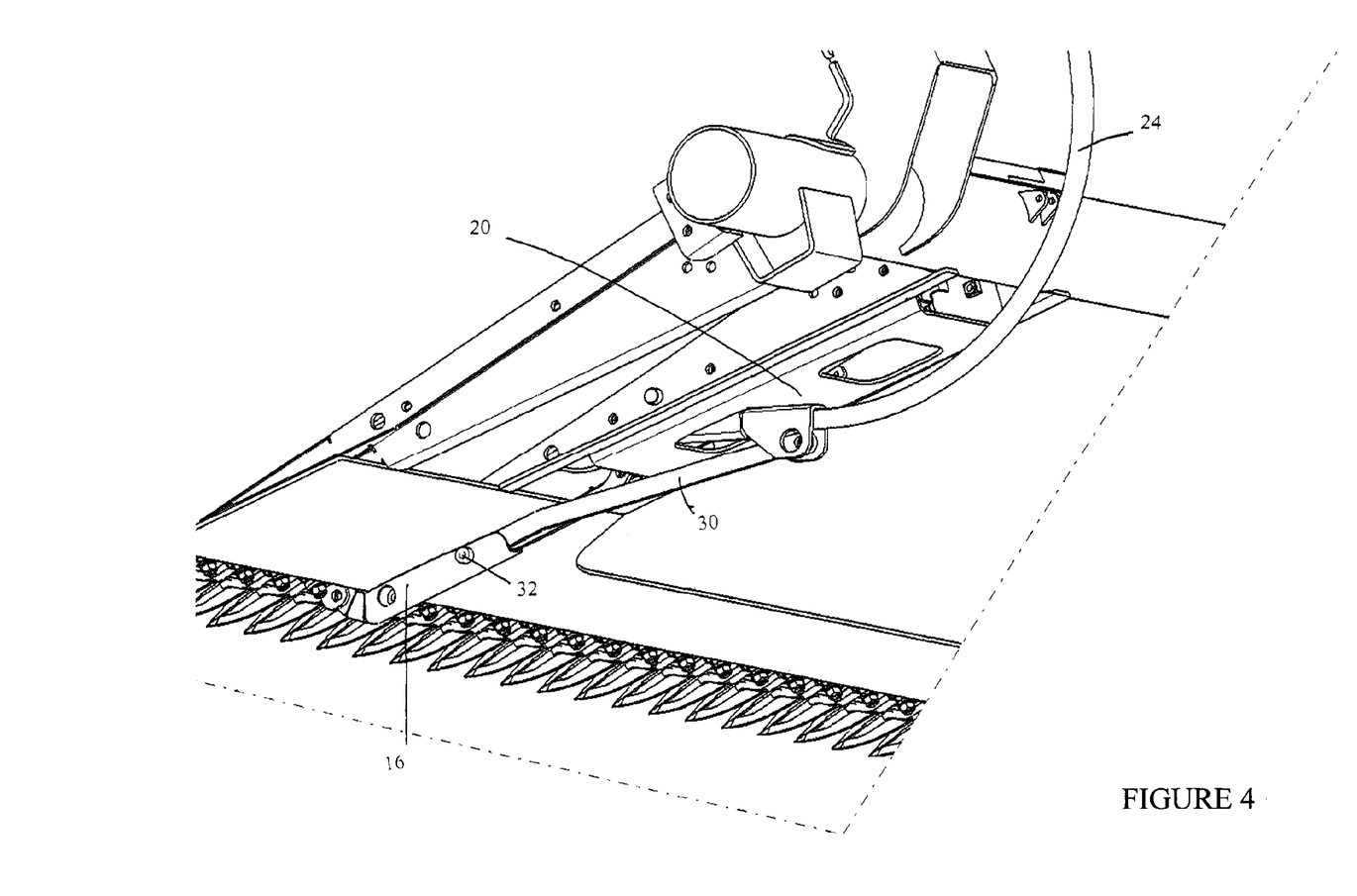
FIG. 4 is a lower perspective view of the ground sensor system in a generally raised position.

As is best seen in FIGS. 3 and 4, just behind the cutter bar 14 is a forward horizontal frame plate 18. Just to the rear of that is a height sensor mounting bracket 20. Over the height sensor mounting bracket 20 and extending forward of it to a fixture on the forward plate 18 is a frame foot 22 (shown cutaway in FIG. 5). Frame foot 22 supports the header platform above it and shelters the height sensor mounting bracket and the linkages and potentiometer within mounting bracket 20.

A rear height sensor arm 24 is mounted on pivot 26 to mounting bracket 20. Chain 25 limits downward travel of rear arm 24 and consequently the entire assembly.

A linkage 30 is attached at a forward pivot 32 to the forward height sensor arm 16 and at a rear pivot 34 to the rear height sensor arm 24 respectively. As is apparent, the pivotal attachment of linkage 30 between the forward height sensor arm 16 and rear height sensor arm 24 causes either of the height sensors to move necessarily when a force or pressure causes the other of the height sensors to move. In this way, the movement of both advantageously ensures that the forward height sensor will not be caught if the harvesting vehicle is reversed or turned sharply, while simultaneously ensuring that a forward sensor can deliver immediate detection of and responsiveness to rapid changes in ground contour as the harvesting vehicle proceeds forward.

Figure 5:
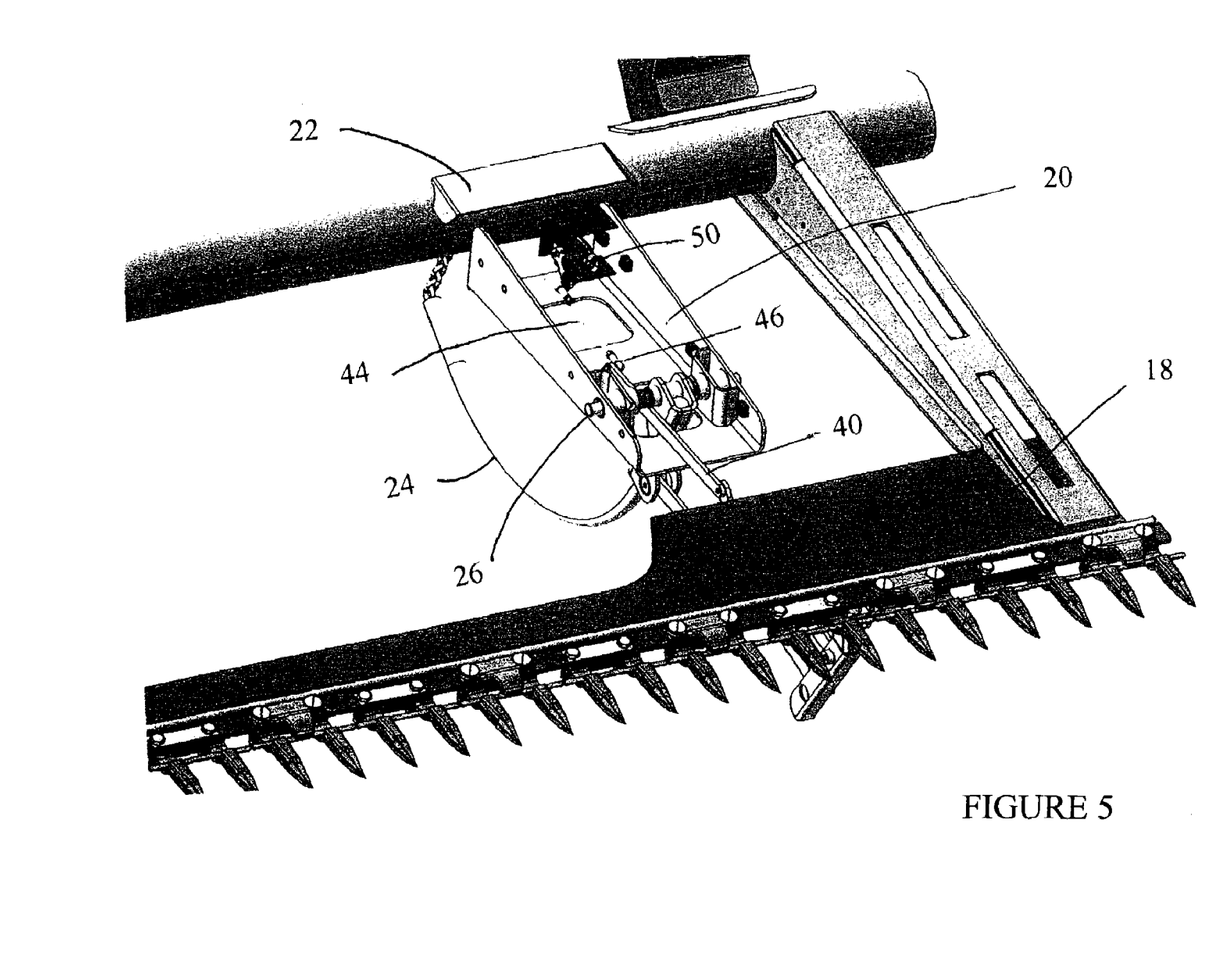
FIG. 5 is a upper perspective cutaway view of the ground sensor.

As best seen in FIG. 5 a potentiometer linkage 40 is pivotally attached to the forward height sensor at a pin 42 and also pivotally attached to a potentiometer extension 44 at pivot point 46 on the mounting bracket 20. Potentiometer 50 is thereby actuated by travel of the potentiometer extension 44, which in turn responds to the generally forward and reverse travel of linkage 40. Either a rotational or linear potentiometer may be used.

Figure 1:
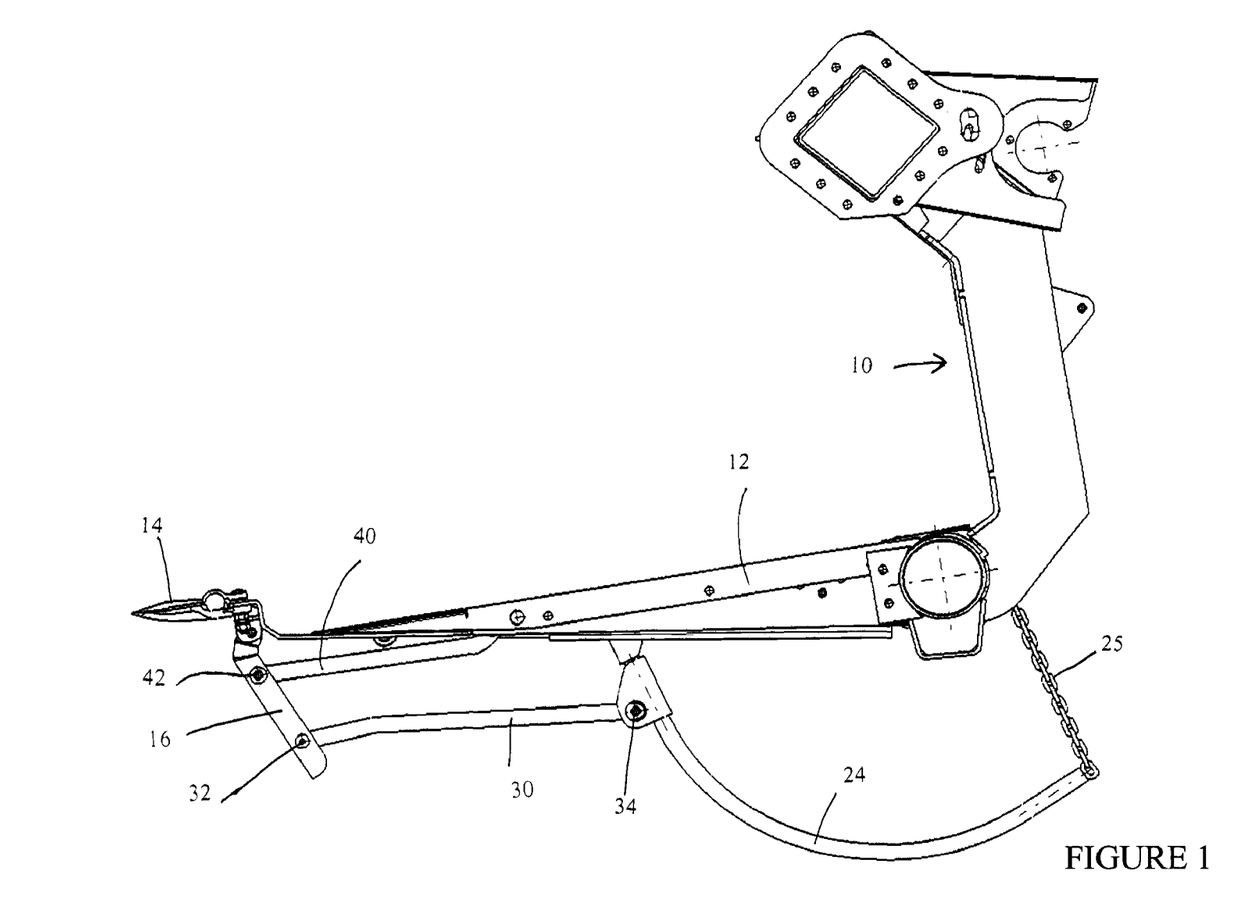
FIG. 1 is a side view of the ground sensor of the present invention in a generally lowered position.
Figure 2:
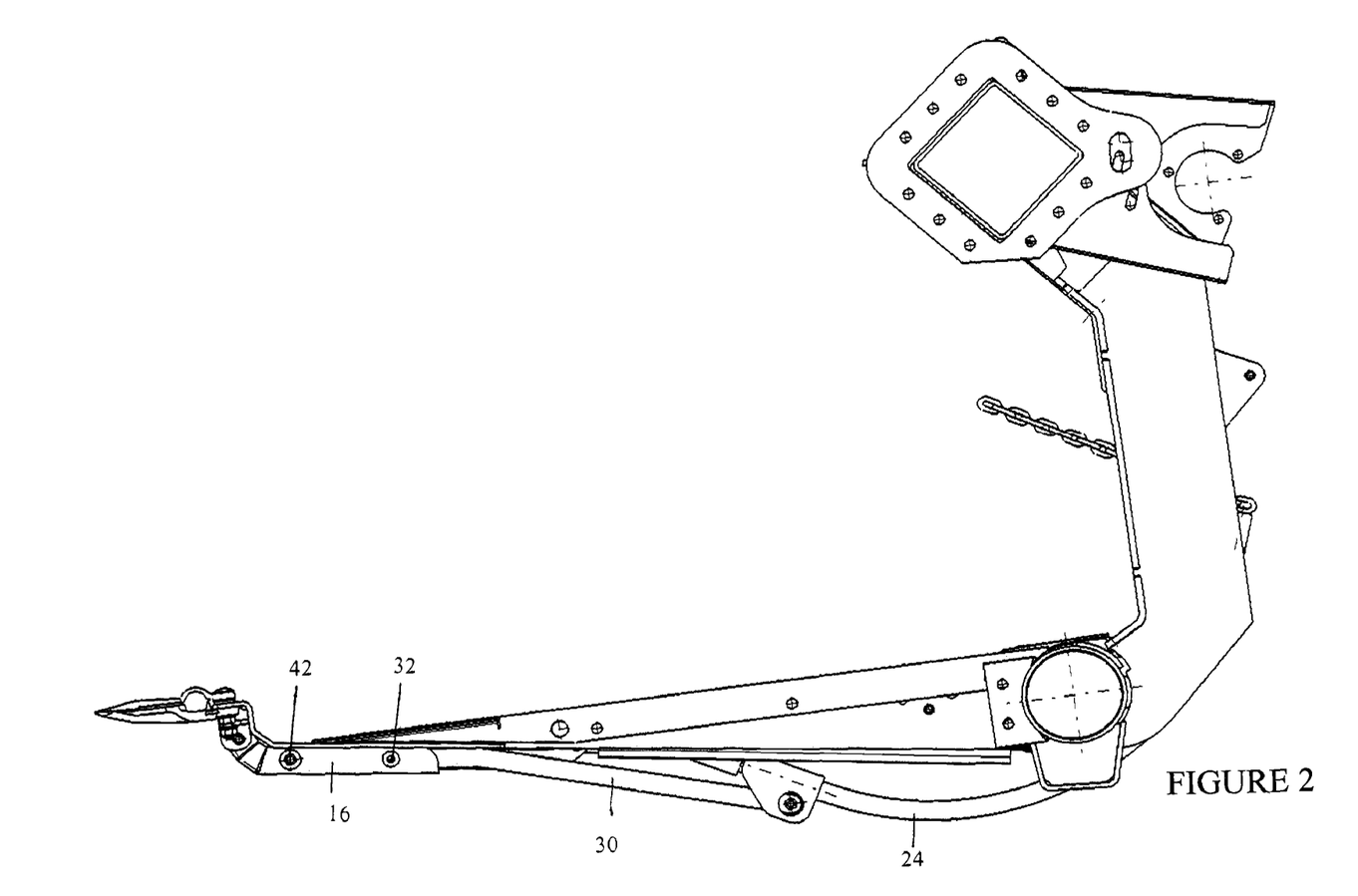
FIG. 2 is a side view of the ground sensor in a raised position.
Figure 6:
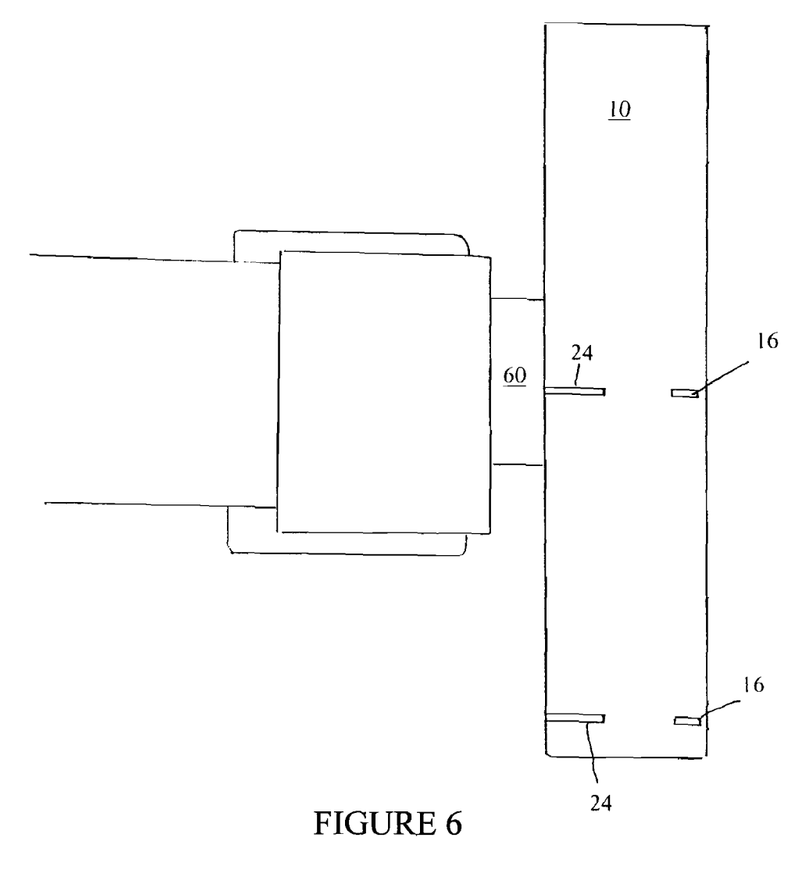
FIG. 6 is a schematic top view of a combine having the ground sensors mounted on its header.
Figure 7:
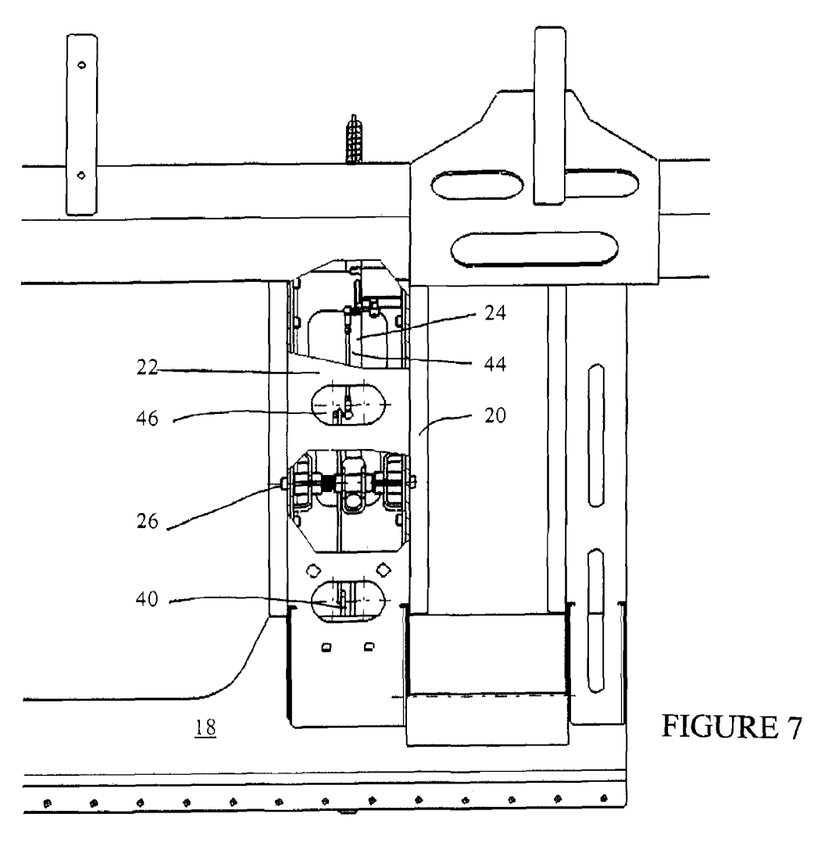
FIG. 7 is a top view of a combine having the ground sensors mounted on its header.

FIG. 6 is a schematic top view of a combine with a header having the ground sensors of the present invention mounted thereon. In the depicted embodiment, header 10 has a central portion in a transverse direction that would substantially correspond to the outer dimensions of the feeder house 60. In the depicted embodiment, the rear sensor arm 24 is dimensioned such that its rearward extent is substantially equivalent to the rearward extent of the header 10, that is, the rear ground sensor ends about at the rear of the header. This remains true whether the rear sensor arm is in a lowered or raised position, see FIGS. 1 and 2. This dimension advantageously allows the ground sensors 24 and 16 to be mounted in the center portion of the header. A greater rearward extent of the rear ground sensor 24 would disadvantageously interfere with the feeder housing and the feeding of crop into it. A center mounting of ground sensors is desirable as for example when the combine is being used on terraced ground and one of the other end portions of the header may be suspended in the air overhanging the terrace, and thereby unable to provide useful signals to the header control module.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A ground sensor system for a combine header comprising:
   a front ground sensor arm, said front ground sensor arm being pivotally attached to a front aspect of a header substantially at a cutter bar;
   a rear ground sensor arm pivotally mounted to a sensor mount;
   said rear ground sensor arm having a rearward extent substantially equivalent to a rearward extent of the header;
   a linkage bar, said linkage bar having a forward end being pivotally attached to a lower portion of said forward ground sensor arm and said linkage bar having a rear end being pivotally attached to a forward portion of said rear ground sensor arm;
   a potentiometer linkage, said potentiometer linkage being pivotally attached to said forward ground sensor arm at a position intermediate to the pivotal attachment of said forward sensor arm to said cutter bar and the pivotal attachment of said linkage bar to said forward ground sensor arm;
   said potentiometer linkage being operatively engaged with a potentiometer mounted on said header, said potentiometer being configurable to send an electronic signal in response to movement of said potentiometer linkage;
   whereby movement of either said rear ground sensor arm or said forward ground sensor arm caused by contact with the ground causes movement in said potentiometer linkage sufficient to operatively engage said potentiometer, regardless of whether the other of said sensor arms is also moved by ground contact.

2. The ground sensor of claim 1 wherein if said header travels in a rearward direction, then contact of said rear ground sensor arm with ground contours elevates said front ground sensor arm such that the ground contour does not damage said front ground sensor arm.

3. The ground sensor system of claim 1 wherein said rear ground sensor arm is pivotally mounted to the header.

4. The ground sensor system of claim 1 wherein said front ground sensor arm is straight.

5. The system of claim 1 further comprising said front ground sensor being shorter than said rear ground sensor arm.

6. The ground sensor system of claim 1 wherein said potentiometer selected from the group comprising:
   a linear potentiometer and a rotational potentiometer.

7. The ground sensor system of claim 1 wherein said front ground sensor and said rear ground sensor are aligned in a direction of travel.

8. The ground sensor system of claim 1 wherein said front ground sensor and said rear ground sensor are mounted on a center portion of the header.

* * * * *